United States Patent
Jin et al.

(10) Patent No.: US 9,772,881 B2
(45) Date of Patent: Sep. 26, 2017

(54) HARDWARE RESOURCE ALLOCATION FOR APPLICATIONS

(71) Applicant: HUA ZHONG UNIVERSITY OF SCIENCE TECHNOLOGY, Wuhan, Hubei (CN)

(72) Inventors: Hai Jin, Wuhan (CN); Xuerong Guo, Wuhan (CN); Song Wu, Wuhan (CN); Xuanhua Shi, Wuhan (CN); Hanfeng Qin, Wuhan (CN)

(73) Assignee: HUA ZHONG UNIVERSITY OF SCIENCE TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 14/647,959

(22) PCT Filed: Oct. 29, 2013

(86) PCT No.: PCT/CN2013/086136
§ 371 (c)(1),
(2) Date: May 28, 2015

(87) PCT Pub. No.: WO2015/061962
PCT Pub. Date: May 7, 2015

(65) Prior Publication Data
US 2015/0301865 A1    Oct. 22, 2015

(51) Int. Cl.
*G06F 9/46* (2006.01)
*G06F 9/50* (2006.01)

(52) U.S. Cl.
CPC .......... *G06F 9/5016* (2013.01); *G06F 9/5011* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 6,725,336 | B2 | 4/2004 | Cherabuddi |
| 7,475,399 | B2 | 1/2009 | Arimilli et al. |
| 7,581,064 | B1 | 8/2009 | Zedlewski et al. |
| 8,156,370 | B2 | 4/2012 | Raghunandan |
| 2004/0194098 | A1 | 9/2004 | Chung et al. |

(Continued)

FOREIGN PATENT DOCUMENTS

| CN | 1641590 A | 7/2005 |
|---|---|---|
| CN | 101663646 A | 3/2010 |

OTHER PUBLICATIONS

Reuse Distance as a Metric for Cache Behavior, 2001.*

(Continued)

*Primary Examiner* — Sisley Kim
(74) *Attorney, Agent, or Firm* — Brundidge & Stanger, P.C.

(57) ABSTRACT

In some examples, in a virtual environment, multiple virtual machines may be executing on a physical computing node. Each of the multiple virtual machines may host one or more applications, each of which utilizes at least a portion of a hardware resource of the physical computing node. A hypervisor of the virtual environment may be configured to recognize utilization patterns of the applications and allocate portions of the hardware resource to each of the applications in accordance with respective utilization patterns of the applications.

13 Claims, 5 Drawing Sheets

(56) References Cited

U.S. PATENT DOCUMENTS

| | | | |
|---|---|---|---|
| 2009/0187713 A1* | 7/2009 | Zedlewski | G06F 11/3409 711/130 |
| 2010/0153649 A1 | 6/2010 | Li et al. | |
| 2010/0268889 A1 | 10/2010 | Conte et al. | |
| 2015/0067262 A1* | 3/2015 | Uttamchandani | G06F 12/0848 711/129 |

OTHER PUBLICATIONS

Chen, D., and Zhong, Y., "Predicting Whole-Program Locality through Reuse Distance Analysis," PLDI '03 Proceedings of the ACM SIGPLAN 2003 conference on Programming language design and implementation, vol. 38, No. 5, pp. 245-257 (Jun. 9-11, 2003).

Tam, D., et al., "Managing Shared L2 Caches on Multicore Systems in Software," In Proc. of the Workshop on the Interaction between Operating Systems and Computer Architecture (WIOSCA), held in Junction with ISCA-34, pp. 8 (Jun. 2007).

International search report and written opinion for PCT application No. PCT/CN2013/086136 mailed on Jul. 30, 2014.

Lu, Q., et al., "Soft-OLP: Improving Hardware Cache Performance Through Software-Controlled Object-Level Partitioning," in PACT'09: 18th International Conference on Parallel Architectures and Compilation Techniques, pp. 246-257 (Sep. 12-16, 2009).

Raj, H., et al., "Resource Management for Isolation Enhanced Cloud Services," CCSW'09, pp. 77-84 (Nov. 13, 2009).

Zhong, Y., et al., et al., "Miss Rate Prediction Across Program Inputs and Cache Configurations," IEEE Transactions on Computers, vol. 56, No. 3, pp. 328-343 (Mar. 2007).

\* cited by examiner

HARDWARE RESOURCE ALLOCATION FOR APPLICATIONS

CROSS-REFERENCE TO RELATED APPLICATION

This Application is the U.S. National Stage filing under 35 U.S.C. §371 of International Application No. PCT/CN2013/086136, filed on Oct. 29, 2013. The disclosure of the International Application is hereby incorporated herein by reference in its entirety.

TECHNICAL FIELD

The technologies described herein pertain generally to hardware resource allocation for multiple applications executing on different virtual machines in a virtual environment.

BACKGROUND

Unless otherwise indicated herein, the approaches described in this section are not prior art to the claims in this application and are not admitted to be prior art by inclusion in this section.

In a typical virtual environment, multiple virtual machines may execute on a physical computing node. Each of the multiple virtual machines may host one or more applications, each of which utilizes at least a portion of a hardware resource of the physical computing node. Thus, the applications may contend for the hardware resource and consequently lower the efficiency of each of the applications.

SUMMARY

Technologies are generally described for hardware resources allocation for applications. The various techniques described herein may be implemented in various devices, methods, computer program products, and/or systems.

In some examples, various embodiments may be implemented as methods. Some methods may include collecting data regarding execution of one or more applications that utilize a hardware resource; identifying, from the collected data, one or more patterns regarding utilization of each of the one or more applications; and allocating different portions of the hardware resource to each of the one or more applications in accordance with the identified patterns.

In some examples, various embodiments may be implemented as systems. Some systems may include one or more virtual machines each configured to execute one or more applications utilizing a common hardware resource; a privileged domain configured to manage the one or more virtual machines, comprising a sampling module configured to collect data regarding execution of the one or more applications, an identifier configured to identify from the collected data, one of one or more patterns regarding execution of each of the one or more applications, and an allocator configured to allocate different portions of the hardware resource in accordance with the one or more utilization patterns.

In some examples, various embodiments may be implemented as computer-readable mediums having executable instructions stored thereon. Some computer-readable mediums may store instructions that, when executed, cause one or more processors to perform operations comprising periodically sampling data regarding execution of one or more applications that utilize a cache; identifying, from the collected data, one of one or more patterns regarding utilization of each of the one or more applications; and allocating different portions of the cache to each of the one or more applications in accordance with the identified patterns.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
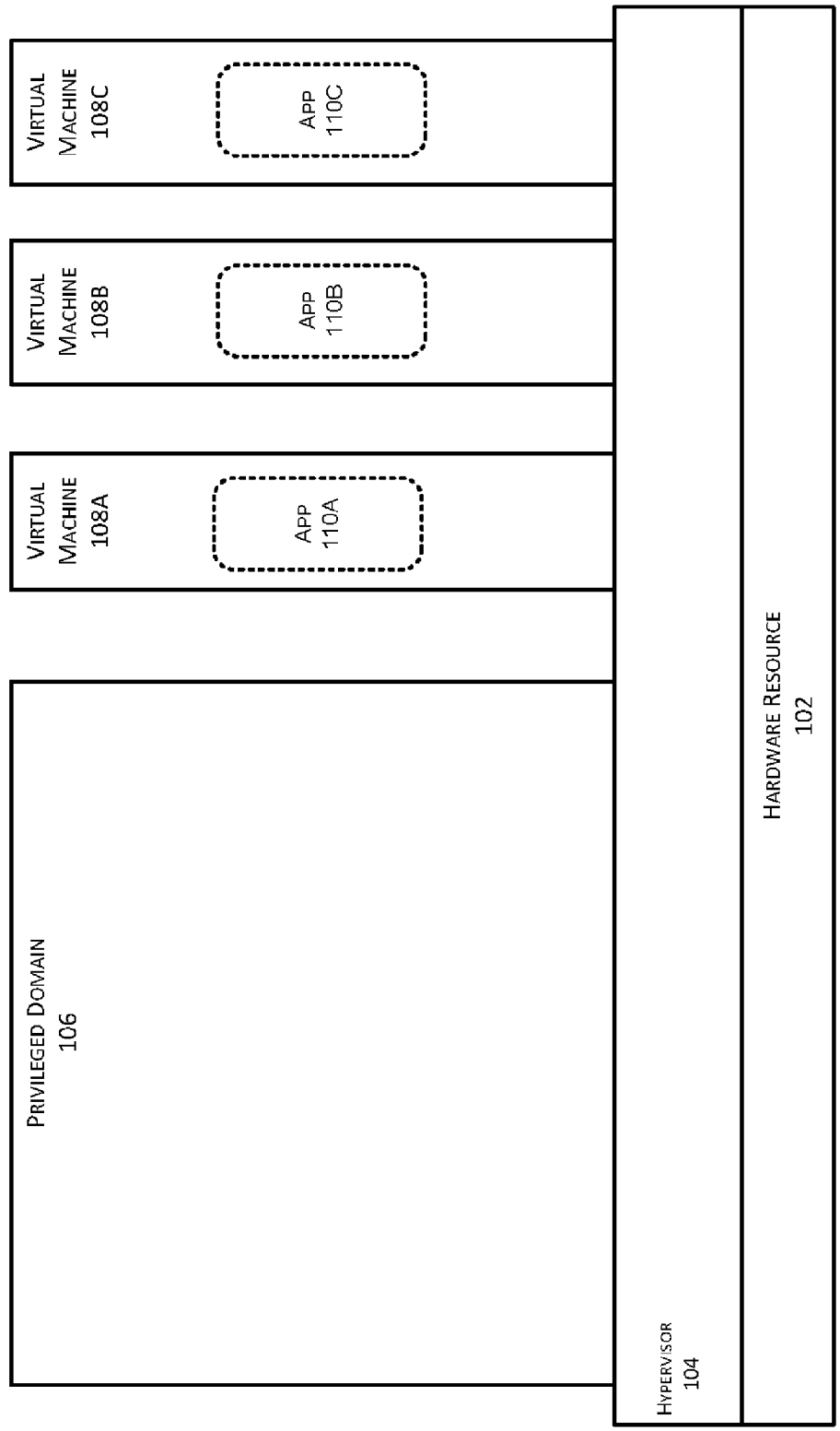
FIG. 1 shows an example virtual environment in which hardware resources allocation for applications may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In a virtual environment, multiple virtual machines may execute on a physical computing node. Each of the multiple virtual machines may host one or more applications, each of which may utilize at least a portion of a hardware resource of the physical computing node. Thus, the applications may contend for the hardware resource and consequently lower the efficiency of each of the applications. One or more software components of a privileged domain of the virtual environment may be configured to recognize utilization patterns of the applications and a hypervisor may be configured to allocate portions of the hardware resource to each of the applications in accordance with respective utilization patterns of the applications.

FIG. 1 shows an example virtual environment 100 in which hardware resources allocation for applications may be implemented, arranged in accordance with at least some embodiments described herein. As depicted, virtual environment 100 may include, at least, one or more hardware resources 102; a hypervisor 104 executing on one or more hardware resources 102; and a privileged domain 106 configured to manage one or more virtual machines 108A, 108B, 108C, etc. Each of virtual machines 108A, 108B, and 108C may be configured to respectively host, at least, applications 110A, 110B, 110C, etc. As referenced herein, virtual machines 108A, 108B, 108C, etc., may be collectively referred to as "virtual machines 108," unless context requires otherwise. Similarly, unless context requires otherwise, "one or more hardware resources 102" may be collectively referred to as hardware resource 102.

Hardware resource 102 may refer to one or more physical elements that constitute a computing system or a physical node. Non-limiting examples of hardware resource 102 may include memories, central processing units (CPUs), graphic processing units (GPUs), caches, etc. In some examples, hardware resource 102 may refer to portions of hardware components of a datacenter that houses computer systems, telecommunication system, storage system, etc.

Hypervisor 104 may refer to a software module that may be configured to execute directly on one or more of hardware resource 102 to receive one or more requests to execute computing tasks from other software modules, i.e., clients, including virtual machines 108; and to manage access to hardware resource 102 in response to independent requests from different software modules. In some example embodiments of hardware resource allocation for applications, hypervisor 104 may be the only module, from among other software modules executed in example virtual environment 100, which has direct access to any of hardware resource 102. For example, by separating virtual machines 108 from hardware resource 102, hypervisor 104 may be able to execute multiple operating systems securely and independently on each of virtual machines 108.

Privileged domain 106 may refer to a software module, initiated by hypervisor 104, that may be configured to manage virtual machines 108. Thus, privileged domain 106 may further be granted, by hypervisor 104, multiple privileges to access hypervisor 104. The privileges may allow privileged domain 106 to manage aspects of virtual machines 108, such as starting, interrupting, stopping, inputting/outputting requests, etc.

Virtual machines 108 may refer to one or more software emulations of physical computing devices, which may be configured to execute software programs as if virtual machines 108 are real physical computing devices. Virtual machines 108 may be initiated and managed by privileged domain 106. In some examples, one or more of virtual machines 108 may be configured to execute an independent operating system that is different from operating systems that are executing on others of virtual machines 108. In other examples, one or more of virtual machines 108 may each be configured to execute a single software program, portions of a single software program, a single process, or an application. Further, although example environment 100 includes virtual machines 108A, 108B, and 108C, such depiction is provided as a non-limiting example that is not so restricted with regard to quantity.

Applications 110A, 110B, 110C, which may be collectively referred to herein as "applications 110" unless context dictates otherwise, may refer to at least a portion of a software program that may be hosted on and/or by one of virtual machines 108. The execution of each of applications 110 may require portions of hardware resource 102, e.g., a cache. Since hardware resources may be limited and executing applications 110 may contend for a common hardware resource, one of applications 110 that utilizes a portion of a hardware resource may adversely impact, i.e., lower the performance of, others of applications 110.

In some example embodiments, privileged domain 106 may be configured to collect data regarding the current execution of applications 110, to generalize a utilization pattern for each of applications 110 based on the collected data, and, further, to select a strategy to allocate portions of the common hardware resource corresponding to the utilization pattern.

Hypervisor 104 may be configured to allocate the common hardware resource in accordance with the selected strategy to reduce the impact on others of applications 110. As referenced herein, utilization patterns may refer to patterns that emerge from utilization information including the capacity of the hardware resources that applications 110 may utilize, the frequency that applications 110 utilize the hardware resources, the impacted performance of applications 110 if the hardware resources are insufficient, etc. In some examples, utilization patterns may be presented as reuse distance histograms as described hereafter.

Figure 2:
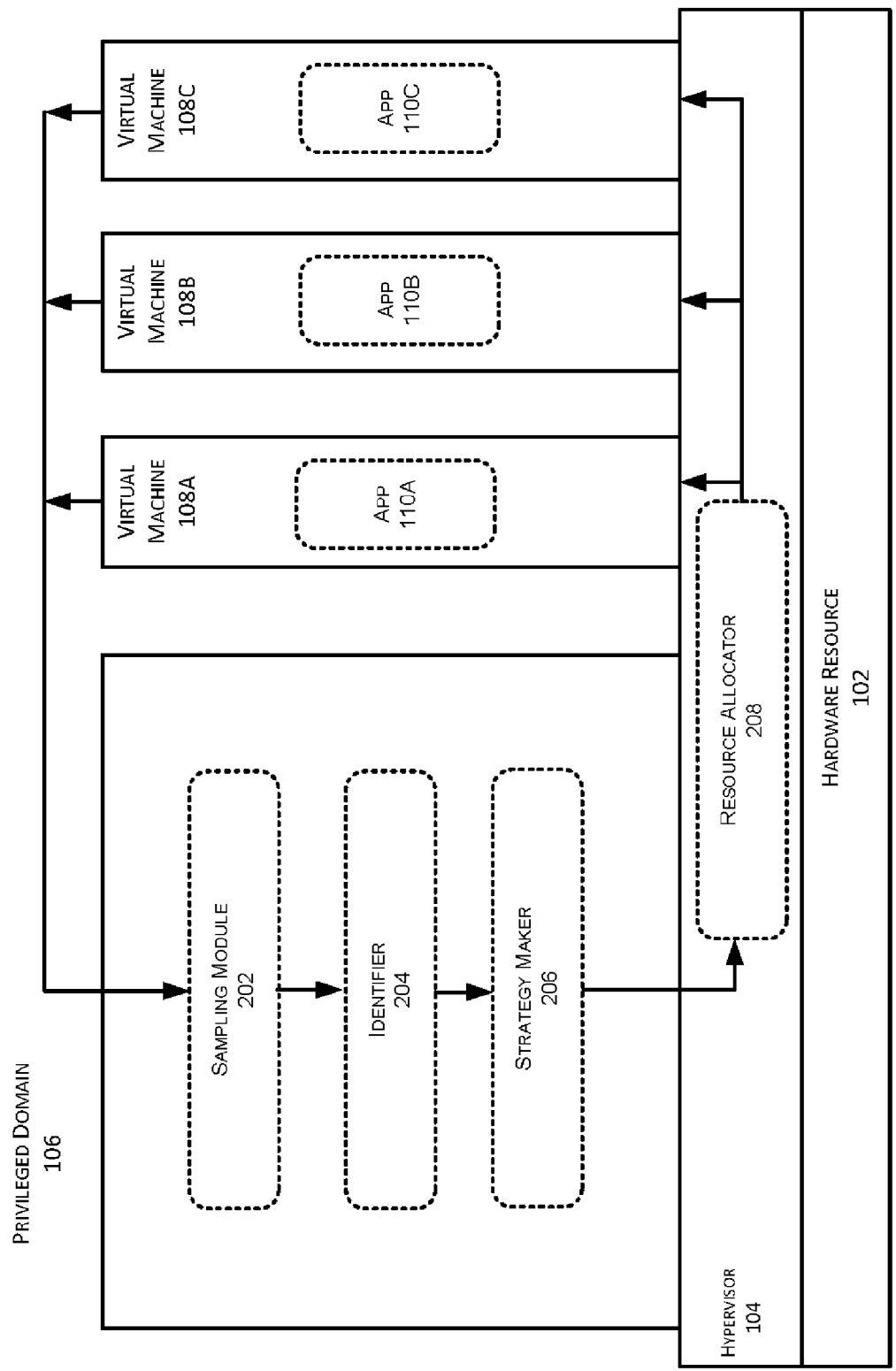
FIG. 2 shows example components of the example virtual environment by which hardware resources allocation for applications may be implemented.

FIG. 2 shows example additional components 200 of example virtual environment 100 by which hardware resources allocation for applications may be implemented, arranged in accordance with at least some embodiments described herein. As depicted, example additional components 200 may include at least a sampling module 202, an identifier 204, a strategy maker 206, and a resource allocator 208. Sampling module 202, identifier 204, and strategy maker 206 may be integrated into privileged domain 106.

Sampling module 202 may refer to a software module that may be configured to collect, e.g., to periodically sample, data regarding current execution of applications 110, which utilize portions of hardware resource 102. In some example embodiments, hardware resource 102 may include physical memory capacity, network bandwidth, cores of processors, etc., and applications 110 may utilize portions of the physical memories, e.g., main memories, caches, etc.

Typically, to access a memory, a processor may be configured to access a memory location in main memories in response to requests from one or more of applications 110. Since reading or writing from a cache typically takes less processing time than reading from or writing to the main memories, the processor may first check for a corresponding entry in the cache before accessing the main memories to determine if the corresponding data is stored in the cache. If the processor finds that corresponding data in the cache, a cache hit has occurred, in which case the processor may continue to access the entry in the cache; otherwise, a cache miss has occurred. The data, with respect to memory access, collected by sampling module 202 may include the memory addresses, i.e., code that identifies a memory location, in the cache that applications 110 accessed, cache miss ratios, cache hit ratios, etc. As referenced herein, cache miss ratio may refer to a proportion of accesses that result in a cache miss.

In some examples, sampling module 202 may be configured to calculate reuse distances regarding utilization of applications 110 based on the collected data and, further, generate a reuse distance histogram for each of applications 110 in accordance with the calculated reuse distances. As referenced herein, reuse distance may refer to a number of distinct cache line accesses between two successive accesses to a same cache line, wherein the cache lines may refer to the data blocks of fixed size for data transfer between a cache and memories. For example, when one of applications 110 sequentially accesses a number of cache lines, e.g., cache line A, cache line B, cache line C, cache line B, and, again, cache line A, the reuse distance of the access to cache line A is three. By sorting all access to the cache based on the reuse distance, sampling module 202 may generate the reuse distance histogram. The horizontal axis of the reuse distance histogram may indicate the size of one or more cache lines that applications 110 accessed between the two successive accesses to the same cache line. The vertical axis of the reuse distance histogram may indicate the corresponding distribution percentage of the reuse distance. For example, if the size of cache line B and cache line C is 16 kilobyte (KB), the reuse distance of the access to cache line A in the previous example may be presented at 48 KB on the reuse distance histogram.

Identifier 204 may refer to a software module that may be configured to identify, from the collected data, one or more patterns regarding utilization of each of applications 110. In accordance with some examples, identifier 204 may be configured to classify applications 110 into three categories of utilization patterns: cache polluters, cache sensitive applications, and cache friendly applications. The classifications may be based on the reuse distance histograms generated for each of applications 110.

Cache polluters may refer to those of applications 110 that are deemed to occupy or require large cache capacity. The performance of cache polluters does not improve until accessible cache for such applications reaches a required capacity. Cache sensitive applications may refer to those of applications 110 that are deemed to be strongly dependent on available cache capacity. The performance of cache sensitive applications may improve and deteriorate substantially as the available cache capacity increases and decreases, respectively. Cache friendly applications may refer to those of applications 110 that are deemed to achieve good performance while occupying low available cache capacity relative to the applications of the other two categories and, thus, cache friendly applications generally have less adverse impact on other applications.

Strategy maker 206 may refer to a software module that may be configured to select one from one or more strategies for a corresponding utilization pattern identified by identifier 204 to ensure the least interference between different categories of applications. Non-limiting examples of the one or more strategies may include allowing cache friendly applications and cache sensitive applications to utilize a same cache simultaneously, separating cache sensitive applications, and not allowing cache polluters and cache sensitive applications to utilize a same cache simultaneously. Such strategies may be generated based on the reuse distance histograms.

Resource allocator 208 may refer to a software module, which may be included in hypervisor 104, that may be configured to allocate different portions of hardware resource 102 in accordance with the selected strategies for each identified utilization pattern. In some example embodiments in which each of virtual machines 108 hosts one of applications 110, resource allocator 208 may be configured to mark different portions of hardware resource 102, e.g., page coloring a cache, so that each of virtual machines 108 may be limited to utilize corresponding portions of hardware resource 102. Thus, since each of virtual machines 108 hosts only one of applications 110, each of applications 110 may be separated to utilize portions of hardware resource 102. For example, in page coloring a cache, a portion of the cache may be marked as red by resource allocator 208 and, thus, only designated to one of virtual machines 108 that hosts a cache sensitive application. Another portion of the cache may be marked as yellow and only designated to another one of virtual machines that hosts a cache polluter. Thus, different applications may be configured to utilize different portions independently in accordance with the identified utilization patterns.

Figure 3:
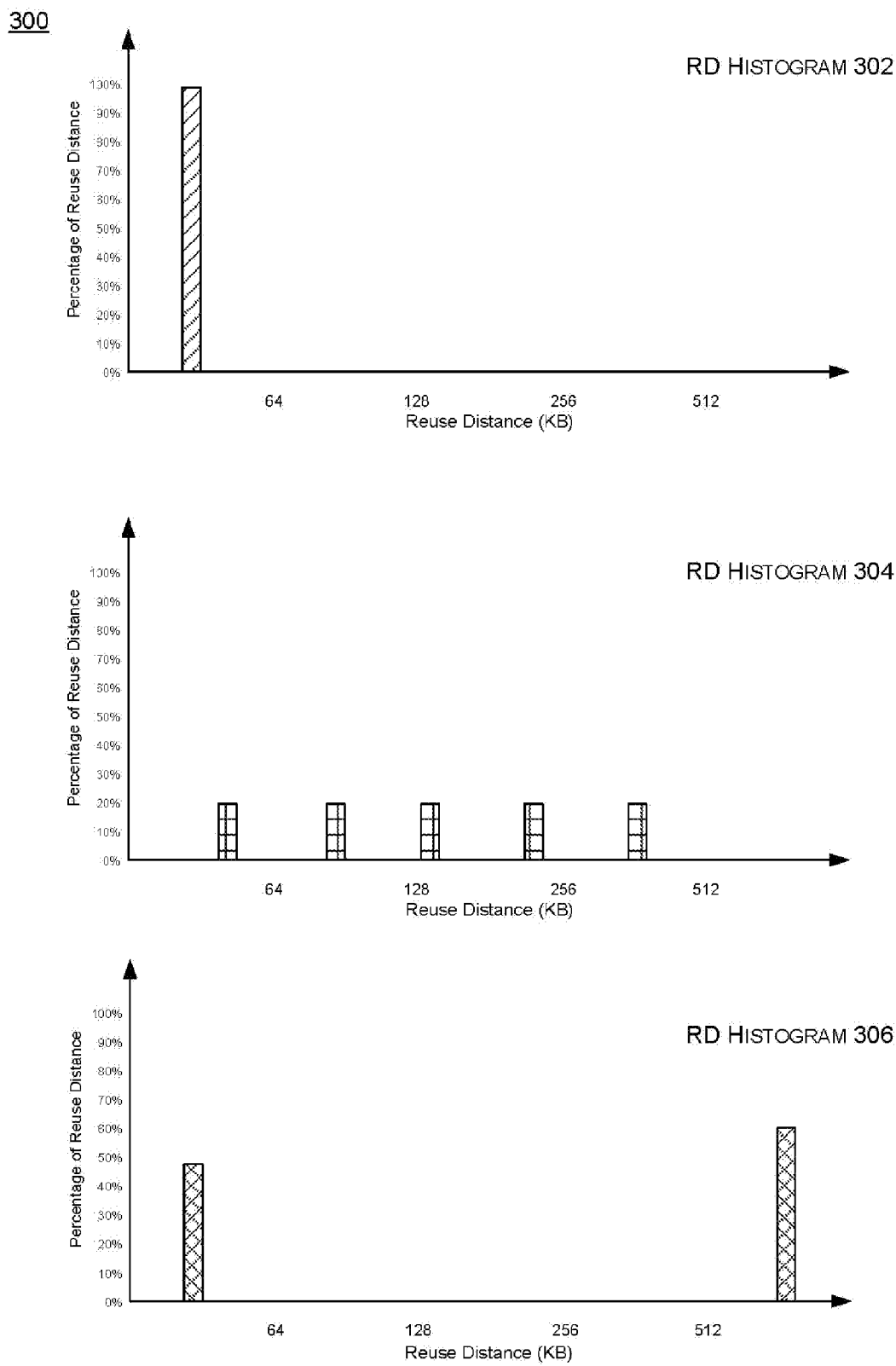
FIG. 3 shows example reuse distance histograms by which hardware resources allocation for applications may be implemented.

FIG. 3 shows example reuse distance histograms 300 by which hardware resources allocation for applications may be implemented, arranged in accordance with at least some embodiments described herein. As depicted, example reuse distance (RD) histograms 300 may include a RD histogram 302, a RD histogram 304, and a RD histogram 306.

RD histogram 302 may refer to an example histogram generated for a cache friendly application. As described above, the horizontal axis of the reuse distance histogram may indicate the size of one or more cache lines that applications 110 have accessed between the two successive accesses to the same cache line, and the vertical axis of the reuse distance histogram may indicate the corresponding distribution percentage of the reuse distance. In RD histogram 302, nearly 100% of the accesses of the application correspond to a reuse distance below 64 KB. That is, increasing available cache for the application does not improve the performance of the application and, thus, this type of application may be co-executed with other applications and may cause insubstantial impact on other types of applications.

RD histogram 304 may refer to an example histogram generated for a cache sensitive application. In RD histogram 304, the reuse distances of the accesses are evenly distributed at five positions on the horizontal axis, which indicates that the performance of the application improves substantially if the available cache size increases and deteriorates substantially when the available cache size decreases.

RD histogram 306 may refer to an example histogram generated for a cache polluter. In RD histogram 306, the reuse distances of the accesses are distributed below 64 KB and above 512 KB, which indicates that the application may not achieve optimal performance, e.g., 90% of its best performance that is estimated assuming infinite cache is provided, until the available cache size is above 512 KB. Thus, cache polluters may occupy a substantial amount of the cache or other types of limited hardware resources and lower the performance of other applications.

Figure 4:
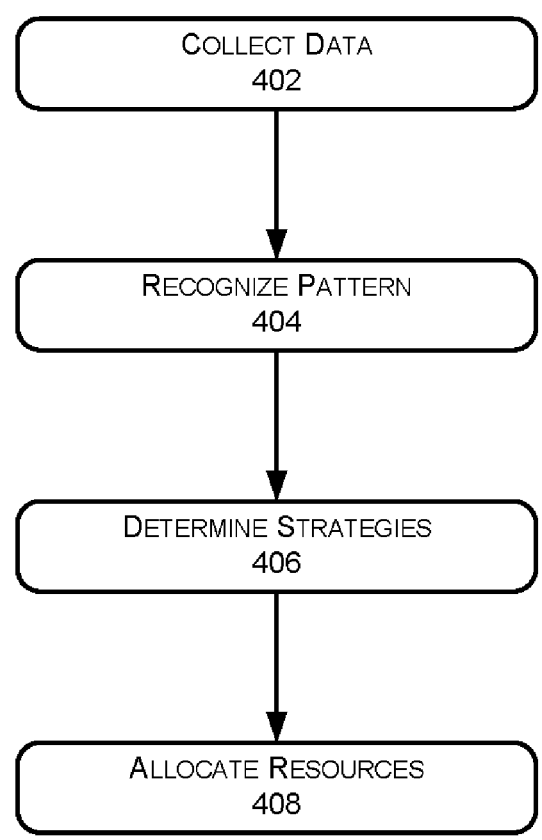
FIG. 4 shows an example configuration of a processing flow of operations by which hardware resources allocation for applications may be implemented.

FIG. 4 shows an example configuration of a processing flow 400 of operations by which hardware resources allocation for applications may be implemented, arranged in accordance with at least some embodiments described herein. As depicted, processing flow 400 may include sub-processes executed by various components that are part of example virtual environment 100. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, and/or 408. Processing may begin at block 402.

Block 402 (Collect Data) may refer to sampling module 202 collecting data regarding applications 110 that utilize one of hardware resource 102. The data collected by sampling module 202 may include memory addresses, i.e., code that each identifies a memory location, in a cache that applications 110 have accessed, cache miss ratios, cache hit ratios, etc. The collected data may then be processed by sampling module 202 to calculate a reuse distance for each access of applications 110 and, further, to generate a reuse distance histogram for each of applications 110. Processing may continue from block 402 to block 404.

Block 404 (Recognize Pattern) may refer to identifier 204 identifying, from the collected data, one or more patterns regarding utilization of each of applications 110. In accordance with some examples, identifier 204 may be configured to classify applications 110, based on the reuse distance histograms generated for each one of applications 110, into three categories of utilization patterns: cache polluters, cache sensitive applications, and cache friendly applications, each of which respectively corresponds to RD histogram 306, RD histogram 304, and RD histogram 302. Processing may continue from block 404 to block 406.

Block 406 (Determine Strategies) may refer to strategy maker 206 selecting one from one or more strategies, which may be stored on portions of hardware resource 102, for a corresponding utilization pattern identified by identifier 204. Non-limiting examples of the one or more strategies may include allowing cache friendly applications and cache sensitive applications to utilize a same cache simultaneously, separating cache sensitive applications, and disallowing cache polluters and cache sensitive applications to utilize a same cache simultaneously. Such strategies may be generated based on the reuse distance histograms to ensure the least interference between different categories of applications. Processing may continue from block 406 to block 408.

Block 408 (Allocate Resources) may refer to resource allocator 208 allocating different portions of hardware resource 102 in accordance with the selected strategies for each identified utilization pattern. In some example embodiments in which each of virtual machines 108 hosts one of applications 110, resource allocator 208 may be configured to mark different portions of hardware resource 102, e.g., page coloring a cache, so that each of virtual machines 108 may be limited to utilize corresponding portions of hardware resource 102. Thus, since each of virtual machines 108 hosts one of applications 110, each of applications 110 may be separated to utilized hardware resource 102. For example, in page coloring a cache, a portion of the cache may be marked as red by resource allocator 208 and, thus, only designated to one of virtual machines 108 that hosts a cache sensitive application. Another portion of the cache may be marked as yellow and only designated to another one of virtual machines that hosts a cache polluter. Thus, different applications may be configured to utilize different portions independently in accordance with the identified utilization patterns.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
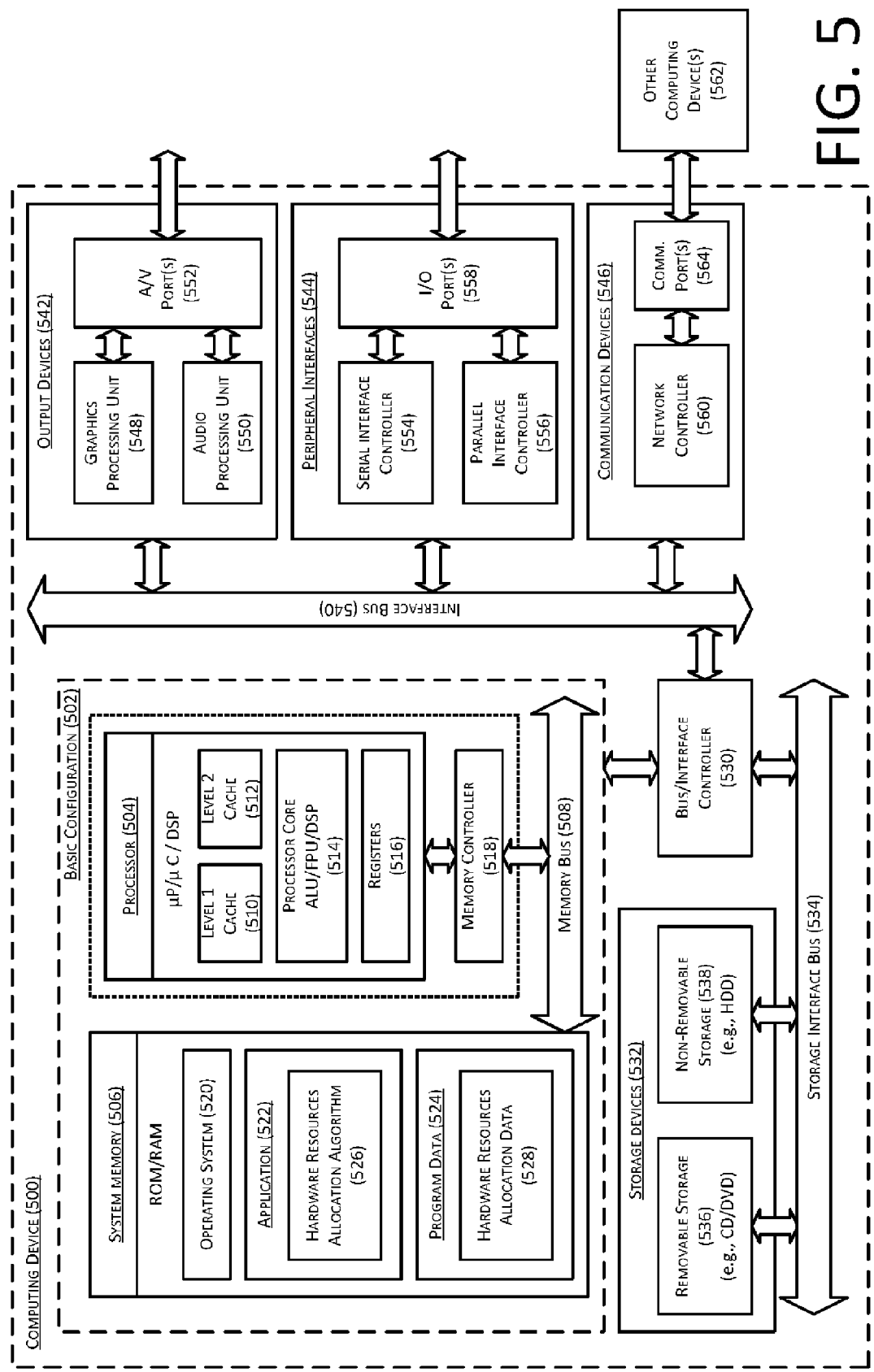
FIG. 5 shows a block diagram illustrating an example computing device that is arranged for which hardware resources allocation for applications, all arranged in accordance with at least some embodiments described herein.

FIG. 5 shows a block diagram illustrating an example computing device that is arranged for which hardware resources allocation for applications, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a hardware resources allocation algorithm 526 that is arranged to perform the functions as described herein including those described with respect to process 400 of FIG. 4. Program data 524 may include hardware resources allocation data 528 that may be useful for operation with hardware resources allocation algorithm 526 as is described herein. In some embodiments, application 522 may be arranged to operate with program data 524 on operating system 520 such that implementations of hardware resources allocation for applications may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to allocate hardware resources, the method comprising:
   collecting data regarding execution of applications that utilize a hardware resource;
   identifying, from the collected data, one or more patterns regarding utilization of each of the applications, wherein the one or more patterns are identified based on a correspondence between one or more reuse distances for each of the applications and a respective distribution percentage of the one or more reuse distances provided by one or more reuse distance histograms, and wherein the identified one or more patterns of each of the applications are used to classify each of the applications;
   classifying, based on the identified one or more patterns, each of the applications into one of a cache polluter application, a cache sensitive application, and a cache friendly application; and
   allocating different portions of the hardware resource to each of the applications in accordance with the identified one or more patterns, wherein the allocating includes allocating one of the applications to require large cache capacity that is classified into the cache polluter application and one of the applications to be strongly dependent on available cache capacity that is classified into the cache sensitive application to utilize different portions of a cache, and wherein the allocating further includes:
   allowing at least two of the applications to utilize a same portion of the hardware resource simultaneously in accordance with the respective identified one or more patterns of the at least two of the applications, wherein the allowing comprises allowing one of the at least two of the applications that is classified into the cache sensitive application and one of the at least two of the applications to achieve good performance that is classified into the cache friendly application to utilize the same portion of the cache simultaneously.

2. The method of claim 1, wherein the collecting comprises periodically sampling the collected data.

3. The method of claim 1, wherein the collected data includes one or more memory addresses, one or more network bandwidths, or one or more cache hit ratios.

4. The method of claim 1, wherein the hardware resource is one or more portions of a physical memory accessible to the applications, one or more portions of the cache, a limited network bandwidth, or one or more cores of a processor.

5. The method of claim 1, wherein each of the one or more reuse distances indicates a number of times at which one of the applications utilizes one or more portions of the hardware resource other than a predetermined portion of the hardware resource during a time period between successive uses of the predetermined portion of the hardware resource by the one of the applications.

6. A system, comprising:
   at least one processor and memory;
   one or more virtual machines configured to execute applications that utilizes a common hardware resource; and
   a privileged domain configured to manage the one or more virtual machines, the managing comprising:
   collecting data regarding execution of the applications,
   identifying, from the collected data, one or more utilization patterns regarding execution of each of the applications, wherein the identifying one or more utilization patterns are based on a correspondence between one or more reuse distances for each of the applications and a respective distribution percentage of the one or more reuse distances provided by one or more reuse distance histograms, and wherein the identified one or more utilization patterns of each of the applications are used to classify each of the applications,
   classifying, based on the identified one or more utilization patterns, each of the applications into one of a cache polluter application, a cache sensitive application, and a cache friendly application, and
   allocating different portions of the common hardware resource in accordance with the identified one or more utilization patterns, wherein the allocating includes allocating one of the applications to require large cache capacity that is classified into the cache polluter application and one of the applications to be strongly dependent on available cache capacity that is classified into the cache sensitive application to utilize different portions of a cache, and wherein the allocating further includes:
   allowing at least two of the applications to utilize a same portion of the common hardware resource simultaneously in accordance with the respective identified one or more utilization patterns of the at least two of the applications, wherein the allowing comprises allowing one of the at least two of the applications that is classified into the cache sensitive application and one of the at least two of the applications to achieve good performance that is classified into the cache friendly application to utilize the same portion of the cache simultaneously.

7. The system of claim 6, wherein the collecting includes collecting the data at a predetermined frequency.

8. The system of claim 6, wherein the collected data includes one or more memory addresses, one or more network bandwidths, or one or more cache hit ratios.

9. The system of claim 6, wherein the common hardware resource is one or more portions of a physical memory, one or more portions of the cache, a limited network bandwidth, or one or more cores of a processor.

10. The system of claim 6, wherein the one or more reuse distance histograms, at least indicate a possibility of competition, caused by one of the applications that utilizes the common hardware resource, with other applications.

11. A non-transitory computer-readable medium that stores executable-instructions that, when executed, cause one or more processors to perform operations comprising:
   periodically sampling data regarding execution of applications that utilize a cache;
   identifying, from the sampled data, one or more patterns regarding utilization of each of the applications, wherein the identifying one or more patterns are based on a correspondence between one or more reuse distances for each of the applications and a respective distribution percentage of the one or more reuse distances provided by one or more reuse distance histograms, wherein the identified one or more patterns of each of the applications are used to classify each of the applications;
   classifying, based on the identified one or more patterns, each of the applications into one of a cache polluter application, a cache sensitive application, and a cache friendly application; and
   allocating different portions of the cache to each of the applications in accordance with the identified one or more patterns, wherein the allocating includes allocating one of the applications to require large cache capacity that is classified into the cache polluter application and one of the applications to be strongly dependent on available cache capacity that is classified into the cache sensitive application to utilize the different portions of the cache, wherein the allocating further includes:

allowing at least two of the applications to utilize a same portion of the cache simultaneously in accordance with the respective identified one or more patterns of the at least two of the applications, wherein the allowing comprises allowing one of the at least two of the applications that is classified into the cache sensitive application and one of the at least two of the applications to achieve good performance that is classified into the cache friendly application to utilize the same portion of the cache simultaneously.

12. The non-transitory computer-readable medium of claim 11, wherein the sampled data includes one or more cache hit ratios.

13. The non-transitory computer-readable medium of claim 11, wherein each of the one or more reuse distances indicates a number of times that one of the applications utilizes one or more portions of the cache other than a predetermined portion of the cache during a time period between successive uses of the predetermined portion of the cache by the one of the applications.

* * * * *

UNITED STATES PATENT AND TRADEMARK OFFICE
CERTIFICATE OF CORRECTION

| | |
|---|---|
| PATENT NO. | : 9,772,881 B2 |
| APPLICATION NO. | : 14/647959 |
| DATED | : September 26, 2017 |
| INVENTOR(S) | : Jin et al. |

It is certified that error appears in the above-identified patent and that said Letters Patent is hereby corrected as shown below:

In the Specification

In Column 2, Line 35, delete "all arranged...herein." and insert the same at Line 36, as a continuation sub-point, therefor.

In the Claims

In Column 13, Line 37, in Claim 1, delete "applications to achieve good performance that" and insert -- applications that --, therefor.

In Column 14, Lines 29-30, in Claim 6, delete "applications to achieve good performance that" and insert -- applications that --, therefor.

In Column 15, Lines 15-16, in Claim 11, delete "applications to achieve good performance that" and insert -- applications that --, therefor.

Signed and Sealed this
Twentieth Day of February, 2018

Andrei Iancu
*Director of the United States Patent and Trademark Office*